(12) United States Patent
Chen et al.

(10) Patent No.: US 9,351,479 B2
(45) Date of Patent: May 31, 2016

(54) HUMMINGBIRD FEEDER

(71) Applicant: Amerihua International Enterprises Inc., Lewis Center, OH (US)

(72) Inventors: David Chen, Lewis Center, OH (US); Leighton Chen, Lewis Center, OH (US)

(73) Assignee: AMERIHUA INTERNATIONAL ENTERPRISES INC., Lewis Center ( * ) Notice: Subject to any disclaimer, the term of this patent is extended or adjusted under 35 U.S.C. 154(b) by 57 days.

(21) Appl. No.: 14/082,423

(22) Filed: Nov. 18, 2013

(65) Prior Publication Data

US 2014/0137804 A1 May 22, 2014

Related U.S. Application Data

(60) Provisional application No. 61/727,510, filed on Nov. 16, 2012.

(51) Int. Cl.
*A01K 7/00* (2006.01)
*A01K 39/02* (2006.01)

(52) U.S. Cl.
CPC .................. *A01K 39/0206* (2013.01)

(58) Field of Classification Search
CPC . A01K 39/0206; A01K 39/01; A01K 39/012; A01K 39/02; A01K 39/00; A01K 39/0213
USPC ................. 119/72, 71, 52.2, 57.8, 61.2–61.3, 119/61.55, 72.5
See application file for complete search history.

(56) References Cited

U.S. PATENT DOCUMENTS

| | | | |
|---|---|---|---|
| 2,570,733 A | 10/1951 | Thomas | |
| D194,846 S | 3/1963 | Parry | |
| 3,089,605 A | 5/1963 | Buonauro | |
| 3,244,150 A | 4/1966 | Benton | |
| 3,372,676 A | 3/1968 | Williams | |
| 3,526,335 A | 9/1970 | Swett et al. | |
| 3,648,661 A | 3/1972 | Moore | |
| D228,769 S | 10/1973 | Bower | |
| 3,822,674 A | 7/1974 | Tobin | |
| 3,913,527 A | 10/1975 | Kilham | |
| D239,182 S | 3/1976 | Kilham | |
| D241,860 S | 10/1976 | Calamia | |
| D252,288 S | 7/1979 | Kilham | |
| 4,691,665 A | 9/1987 | Hefner | |
| 4,732,112 A * | 3/1988 | Fenner | A01K 39/012 119/52.2 |
| 4,738,221 A * | 4/1988 | Nock | A01K 39/026 119/464 |
| D299,770 S | 2/1989 | Coffer | |
| 4,896,628 A * | 1/1990 | Kadunce | A01K 39/014 119/52.1 |
| 4,901,673 A | 2/1990 | Overstreet | |
| 4,938,168 A | 7/1990 | Meidell | |
| 4,955,319 A | 9/1990 | Brucker | |
| 4,980,990 A | 1/1991 | Hiday | |
| 5,062,390 A | 11/1991 | Bescherer et al. | |
| 5,195,463 A | 3/1993 | Lorenzana | |
| 5,247,904 A | 9/1993 | Anderson | |
| D356,422 S | 3/1995 | Parker | |
| 5,454,348 A | 10/1995 | Colwell et al. | |
| 5,507,249 A | 4/1996 | Shaw | |
| 5,572,949 A * | 11/1996 | Bryant, Jr. | A01K 5/0241 119/57.91 |
| D382,376 S | 8/1997 | Bescherer | |

(Continued)

*Primary Examiner* — Joshua Huson
(74) *Attorney, Agent, or Firm* — Standley Law Group LLP

(57) ABSTRACT

A birdfeeder that is easy to disassemble and clean and re-assemble. The birdfeeder further having a configuration such that it can be affixed to like birdfeeders to increase the amount of birdfood being offered.

5 Claims, 6 Drawing Sheets

(56) References Cited

U.S. PATENT DOCUMENTS

| | | |
|---|---|---|
| D383,877 S | 9/1997 | Doornbos |
| D383,878 S | 9/1997 | Merino et al. |
| 5,671,696 A * | 9/1997 | Liethen ............... A01K 39/012 |
| | | 119/57.8 |
| D385,066 S | 10/1997 | Doornbos |
| D385,067 S | 10/1997 | Whittles |
| D386,834 S | 11/1997 | Nissim et al. |
| D386,835 S | 11/1997 | Passamare |
| D386,836 S | 11/1997 | Hunt |
| D386,837 S | 11/1997 | Johnson |
| 5,682,835 A | 11/1997 | Walter et al. |
| D396,331 S | 7/1998 | Niemetz |
| D396,334 S | 7/1998 | Gutierrez |
| D397,529 S | 8/1998 | Fuller et al. |
| D398,424 S | 9/1998 | Wenstrand |
| D398,722 S | 9/1998 | Hardison |
| D399,611 S | 10/1998 | Ericson et al. |
| D402,430 S | 12/1998 | Dudley |
| D402,431 S | 12/1998 | Peterson |
| D407,173 S | 3/1999 | Marshall |
| D407,863 S | 4/1999 | Leal et al. |
| D408,947 S | 4/1999 | Mandell |
| D409,338 S | 5/1999 | Gallardo |
| D409,339 S | 5/1999 | Silano et al. |
| D412,225 S | 7/1999 | Williams |
| 5,947,054 A | 9/1999 | Liethen |
| D414,902 S | 10/1999 | Carpenter |
| D417,528 S | 12/1999 | Rizzo |
| D420,176 S | 2/2000 | Heinzeroth |
| D420,177 S | 2/2000 | Jones |
| D421,159 S | 2/2000 | Kreusser |
| D422,122 S | 3/2000 | Vore et al. |
| D422,756 S | 4/2000 | Geiger et al. |
| D423,731 S | 4/2000 | Heitz |
| D424,251 S | 5/2000 | Pickering |
| D425,675 S | 5/2000 | Bonder et al. |
| 6,067,934 A | 5/2000 | Harwich |
| D426,352 S | 6/2000 | Zernov |
| D426,683 S | 6/2000 | Rogers |
| D427,387 S | 6/2000 | Millet et al. |
| D427,732 S | 7/2000 | Corletta |
| D428,216 S | 7/2000 | Bonder et al. |
| D428,537 S | 7/2000 | Miller |
| D428,675 S | 7/2000 | Kokernot et al. |
| D429,852 S | 8/2000 | Hogarty |
| 6,101,974 A | 8/2000 | Frohlich |
| D431,330 S | 9/2000 | Jones |
| D440,361 S | 4/2001 | Colwell |
| D441,148 S | 4/2001 | Bruni et al. |
| D441,923 S | 5/2001 | Garcia-Lucio et al. |
| D444,598 S | 7/2001 | McNeely et al. |
| D448,126 S | 9/2001 | Colwell |
| 6,302,286 B1 | 10/2001 | Witherspoon |
| D450,892 S | 11/2001 | Garcia-Lucio et al. |
| D450,893 S | 11/2001 | Garcia-Lucio et al. |
| D451,251 S | 11/2001 | Chrisco et al. |
| D452,048 S | 12/2001 | Colwell |
| D452,943 S | 1/2002 | Gallegos |
| D454,669 S | 3/2002 | Lieb |
| 6,360,690 B1 | 3/2002 | Canby |
| D460,383 S | 7/2002 | Weiser et al. |
| D460,839 S | 7/2002 | Kreger et al. |
| D462,486 S | 9/2002 | Razor |
| D466,255 S | 11/2002 | Kuelbs |
| D466,656 S | 12/2002 | Kuelbs et al. |
| D469,930 S | 2/2003 | Bloedorn |
| D470,629 S | 2/2003 | Kuelbs |
| D470,630 S | 2/2003 | Kuelbs |
| D471,326 S | 3/2003 | Weiser et al. |
| D471,327 S | 3/2003 | Kuelbs |
| D472,351 S | 3/2003 | Griffin |
| D474,564 S | 5/2003 | Reed |
| D476,117 S | 6/2003 | Nicholas |
| D479,380 S | 9/2003 | Robinson |
| D479,633 S | 9/2003 | Weiser et al. |
| D483,529 S | 12/2003 | Fort, II |
| 6,659,041 B1 | 12/2003 | Curts |
| D485,022 S | 1/2004 | Green |
| D485,397 S | 1/2004 | Green |
| D485,398 S | 1/2004 | Green |
| D485,650 S | 1/2004 | Green |
| D486,278 S | 2/2004 | Nauert |
| D487,824 S | 3/2004 | Hayes |
| D488,590 S | 4/2004 | Fort, II |
| D490,192 S | 5/2004 | Markusen et al. |
| D490,576 S | 5/2004 | Rich et al. |
| D497,226 S | 10/2004 | Nauert |
| D497,458 S | 10/2004 | Nauert |
| D498,335 S | 11/2004 | Donegan |
| D502,293 S | 2/2005 | Harger |
| D503,019 S | 3/2005 | Swift et al. |
| D504,547 S | 4/2005 | Nauert |
| D504,745 S | 5/2005 | Leech |
| D504,746 S | 5/2005 | Lee |
| D505,227 S | 5/2005 | Sasso |
| D505,755 S | 5/2005 | Lundstrom et al. |
| D509,325 S | 9/2005 | Jung et al. |
| D509,629 S | 9/2005 | Holliday |
| D511,866 S | 11/2005 | Lundstrom et al. |
| D514,748 S | 2/2006 | Sweasy |
| 7,000,566 B2 | 2/2006 | Fort, II |
| D520,192 S | 5/2006 | Holliday |
| D521,194 S | 5/2006 | Weiland |
| D521,689 S | 5/2006 | Lombard |
| D522,119 S | 5/2006 | Baraky et al. |
| D522,699 S | 6/2006 | Colvin et al. |
| D523,184 S | 6/2006 | Colvin et al. |
| D524,490 S | 7/2006 | Obenshain |
| 7,093,562 B2 | 8/2006 | Smothers |
| D530,457 S | 10/2006 | Jung et al. |
| D536,838 S | 2/2007 | Colvin et al. |
| D536,839 S | 2/2007 | Colvin et al. |
| D538,706 S | 3/2007 | Williams |
| D539,991 S | 4/2007 | Petrie et al. |
| D542,479 S | 5/2007 | O'Dell |
| D542,982 S | 5/2007 | Wendell |
| D543,132 S | 5/2007 | Sexton et al. |
| D544,153 S | 6/2007 | Obenshain |
| D545,079 S | 6/2007 | Peterson |
| 7,231,890 B2 | 6/2007 | Colvin |
| 7,234,418 B2 | 6/2007 | Fort, II et al. |
| D546,239 S | 7/2007 | Sexton et al. |
| D555,841 S | 11/2007 | Fan |
| D555,842 S | 11/2007 | Fan |
| D556,953 S | 12/2007 | Ison |
| D566,344 S | 4/2008 | Schatz |
| D568,547 S | 5/2008 | Yanick |
| 7,370,607 B2 | 5/2008 | O'Dell |
| D571,056 S | 6/2008 | Bloedorn |
| D572,866 S | 7/2008 | Bloedorn |
| D575,462 S | 8/2008 | Cienfuegos |
| 7,448,346 B1 | 11/2008 | Stone et al. |
| 7,448,347 B2 | 11/2008 | Richmond |
| D595,015 S | 6/2009 | Lauretano |
| D597,648 S | 8/2009 | Heflin |
| D601,760 S | 10/2009 | Friess |
| D602,650 S | 10/2009 | Garcia-Lucio et al. |
| 7,600,487 B2 | 10/2009 | Stone et al. |
| D603,567 S | 11/2009 | Chen et al. |
| D606,708 S | 12/2009 | McMullen |
| D606,709 S | 12/2009 | McMullen |
| D609,862 S | 2/2010 | Gardner |
| D609,863 S | 2/2010 | Gardner |
| D609,864 S | 2/2010 | Tsai |
| D610,750 S | 2/2010 | Mowbray |
| D611,661 S | 3/2010 | Llewellyn |
| D611,662 S | 3/2010 | Vosbikian |
| D612,107 S | 3/2010 | Gardner |
| D612,108 S | 3/2010 | Torres et al. |
| D612,548 S | 3/2010 | Campbell |
| D612,549 S | 3/2010 | Garcia-Lucio et al. |
| 7,685,969 B2 | 3/2010 | Stone et al. |
| D621,557 S | 8/2010 | Panning et al. |
| D622,910 S | 8/2010 | Puckett |

(56) References Cited

U.S. PATENT DOCUMENTS

| | | | |
|---|---|---|---|
| D623,805 S | 9/2010 | Vosbikian | |
| 7,789,040 B2 | 9/2010 | Liethen | |
| D625,401 S | 10/2010 | Perman | |
| D630,791 S | 1/2011 | Wanders | |
| 7,861,671 B2 | 1/2011 | Carter et al. | |
| 7,874,264 B2 | 1/2011 | McMullen | |
| D637,359 S | 5/2011 | Gardner | |
| D638,588 S | 5/2011 | Vosbikian | |
| 7,946,249 B2 | 5/2011 | Colvin et al. | |
| 7,958,845 B2 | 6/2011 | Gardner | |
| 7,997,434 B2 | 8/2011 | Benetti | |
| 8,011,323 B2 | 9/2011 | Vaughn, Jr. et al. | |
| 8,028,658 B2 | 10/2011 | Stone et al. | |
| 8,051,803 B2 | 11/2011 | Gauker et al. | |
| D652,175 S | 1/2012 | Schatz | |
| D656,279 S | 3/2012 | Tu | |
| D656,690 S | 3/2012 | Tu | |
| D665,153 S | 8/2012 | Suiter | |
| 8,245,667 B2 | 8/2012 | Mateer et al. | |
| 8,276,541 B2 | 10/2012 | LoRocco et al. | |
| 8,291,862 B2 | 10/2012 | Gauker et al. | |
| 8,333,168 B2 | 12/2012 | Vaughn, Jr. et al. | |
| 8,347,818 B2 | 1/2013 | Cowger et al. | |
| D676,614 S | 2/2013 | Fields et al. | |
| D683,909 S | 6/2013 | Muhr et al. | |
| D683,911 S | 6/2013 | Muhr et al. | |
| 8,522,717 B2 | 9/2013 | Carter et al. | |
| 8,522,718 B2 | 9/2013 | Cruz et al. | |
| D698,098 S | 1/2014 | Muhr et al. | |
| D698,099 S | 1/2014 | Muhr et al. | |
| D698,100 S | 1/2014 | Muhr et al. | |
| D698,101 S | 1/2014 | Muhr et al. | |
| D698,102 S | 1/2014 | Muhr et al. | |
| D698,501 S | 1/2014 | Muhr et al. | |
| D707,401 S | 6/2014 | Chen et al. | |
| 8,739,733 B2 | 6/2014 | Gauker et al. | |
| 8,763,556 B1 | 7/2014 | Vaughn, Jr. | |
| 8,763,558 B2 | 7/2014 | Gauker et al. | |
| 2002/0003172 A1 | 1/2002 | Sims | |
| 2003/0033988 A1 | 2/2003 | Sasso | |
| 2003/0097995 A1 | 5/2003 | Garcia-Lucio et al. | |
| 2004/0118354 A1 | 6/2004 | Cox et al. | |
| 2005/0000459 A1 | 1/2005 | Buhl et al. | |
| 2006/0037546 A1 | 2/2006 | Jung et al. | |
| 2006/0065202 A1 | 3/2006 | Fort, II et al. | |
| 2006/0124067 A1 | 6/2006 | Taylor | |
| 2006/0254527 A1* | 11/2006 | Nock | 119/52.2 |
| 2007/0012693 A1* | 1/2007 | Kummer | 220/4.27 |
| 2007/0272161 A1 | 11/2007 | Stone et al. | |
| 2007/0289540 A1 | 12/2007 | Stone et al. | |
| 2008/0087225 A1 | 4/2008 | Lin | |
| 2008/0105206 A1 | 5/2008 | Rich et al. | |
| 2008/0257273 A1 | 10/2008 | Carter et al. | |
| 2009/0078211 A1 | 3/2009 | Charlton | |
| 2009/0133636 A1 | 5/2009 | Richmond | |
| 2009/0145875 A1 | 6/2009 | Gardner | |
| 2009/0199777 A1 | 8/2009 | Webber | |
| 2009/0320765 A1* | 12/2009 | Gauker et al. | 119/75 |
| 2010/0024738 A1 | 2/2010 | Chen et al. | |
| 2010/0089328 A1 | 4/2010 | Puckett et al. | |
| 2010/0089330 A1* | 4/2010 | McMullen | 119/52.3 |
| 2010/0224132 A1 | 9/2010 | Gauker et al. | |
| 2010/0229801 A1 | 9/2010 | Stone et al. | |
| 2010/0242848 A1 | 9/2010 | Vaughn, Jr. et al. | |
| 2011/0073043 A1 | 3/2011 | Dault | |
| 2011/0094449 A1 | 4/2011 | George | |
| 2011/0100300 A1 | 5/2011 | Carter et al. | |
| 2011/0168101 A1 | 7/2011 | Guay et al. | |
| 2011/0239949 A1 | 10/2011 | Abbott | |
| 2011/0277691 A1 | 11/2011 | Sundquist | |
| 2011/0297095 A1 | 12/2011 | Cruz et al. | |
| 2012/0060762 A1 | 3/2012 | Cowger et al. | |
| 2012/0079988 A1 | 4/2012 | Vaughn, Jr. et al. | |
| 2012/0132145 A1 | 5/2012 | Gauker et al. | |
| 2012/0216750 A1 | 8/2012 | Cruz et al. | |
| 2012/0279454 A1 | 11/2012 | Gauker et al. | |
| 2013/0098297 A1 | 4/2013 | Chen et al. | |
| 2014/0109835 A1 | 4/2014 | Colvin et al. | |
| 2014/0158056 A1 | 6/2014 | Vaughn, Jr. et al. | |

\* cited by examiner

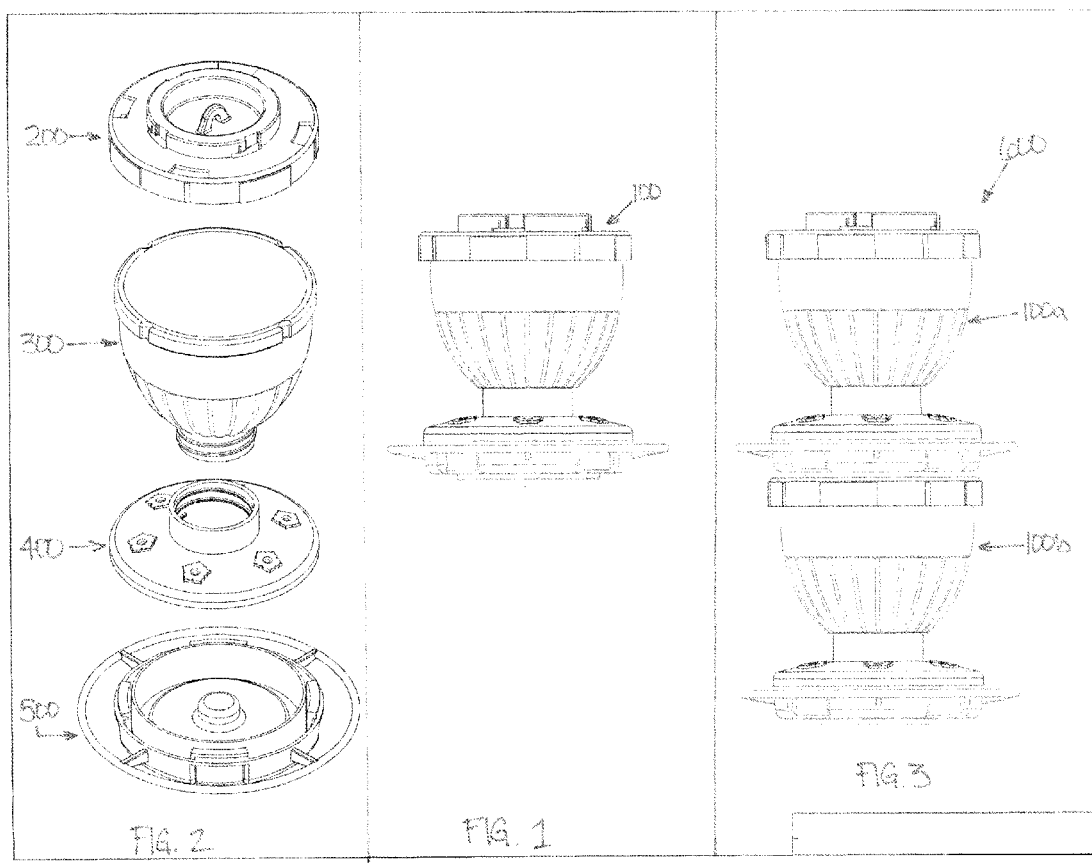

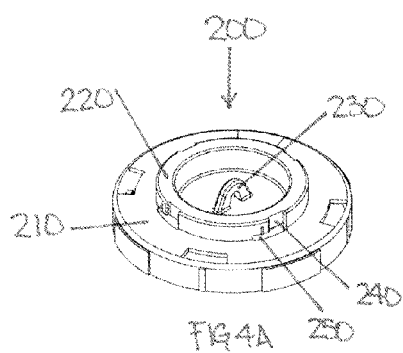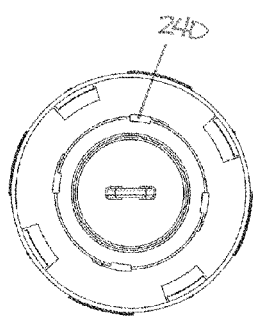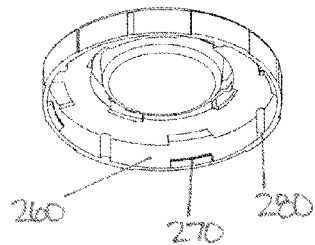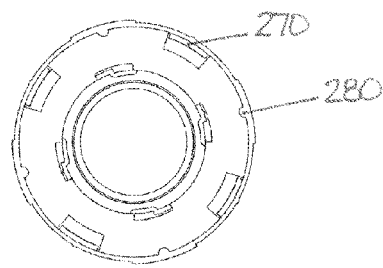

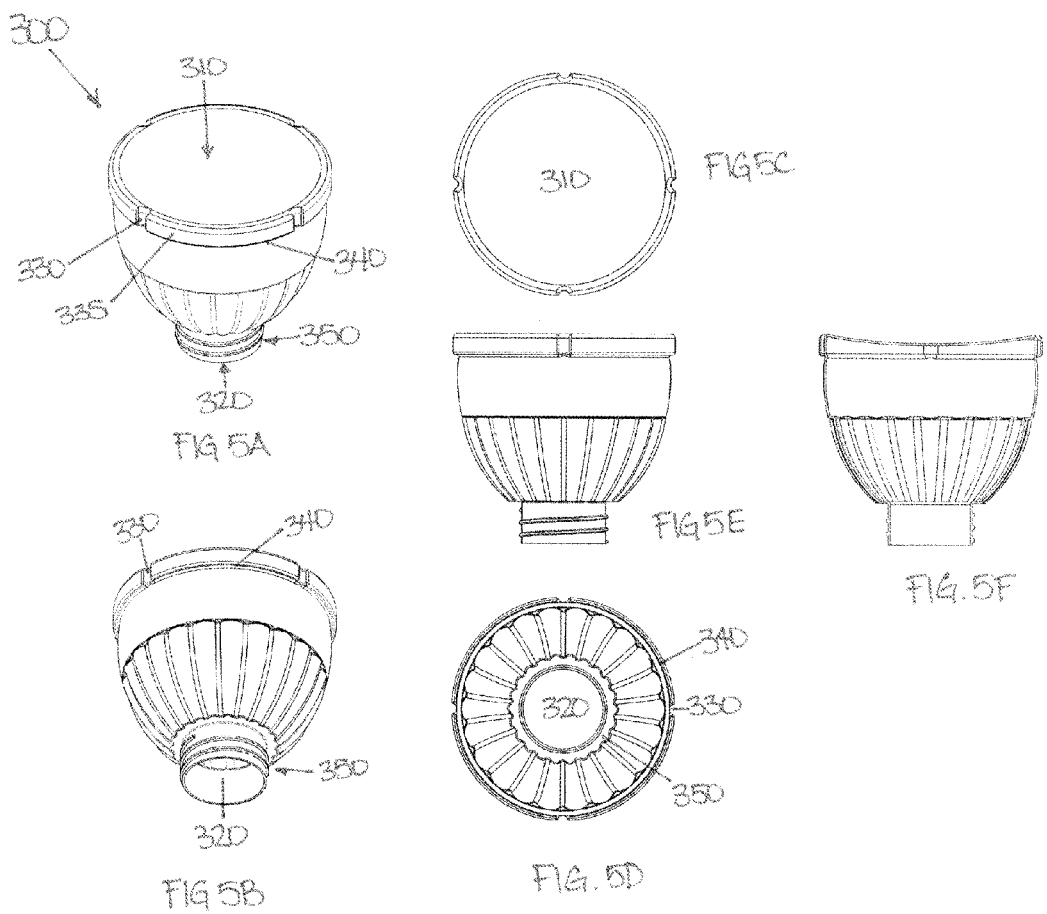

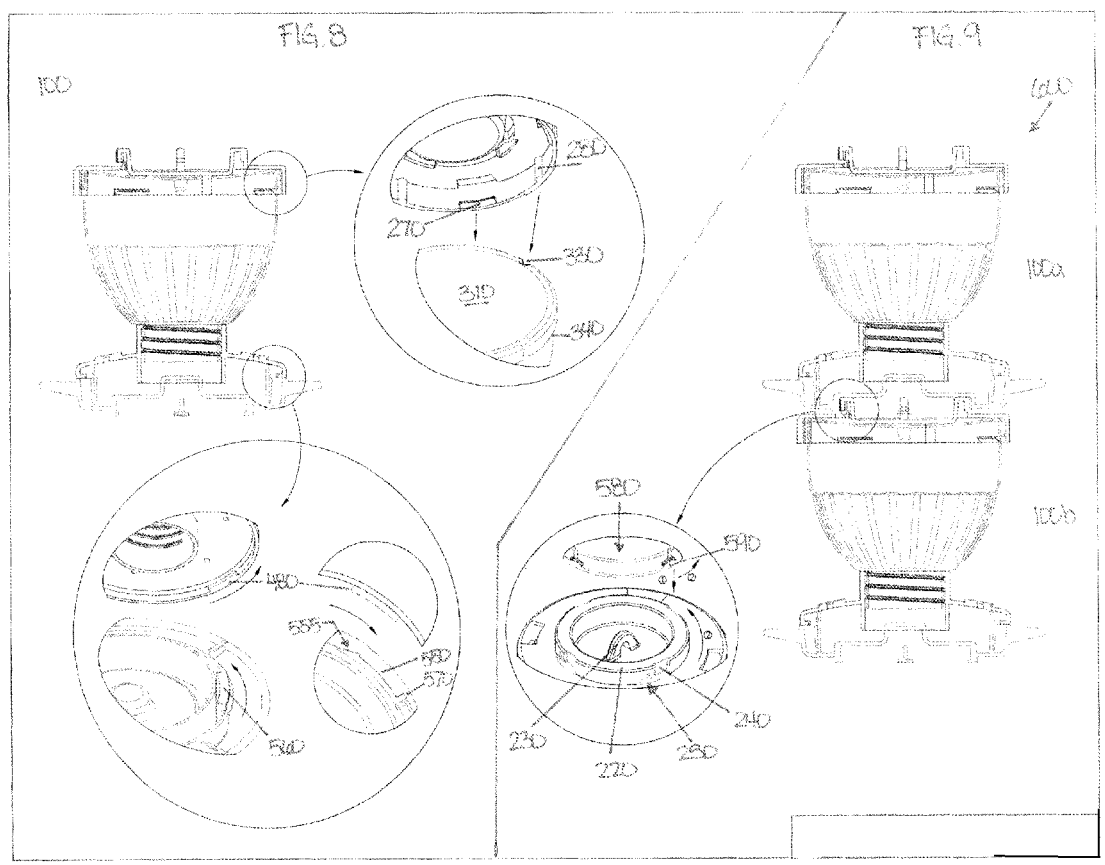

HUMMINGBIRD FEEDER

CROSS-REFERENCE TO RELATED APPLICATIONS

This application claims the benefit of U.S. Provisional Application No. 61/727,510, filed Nov. 16, 2012, which is hereby incorporated by reference in its entirety.

TECHNICAL FIELD

The present invention relates generally to a bird feeder and, more particularly, to a hummingbird feeder.

BACKGROUND

A conventional hummingbird feeder typically includes a small-mouth bottle and a base. Due to the presence of high sugar content in hummingbird nectar, which results in accumulation of solids and growth of mold inside the bottle and base, frequent cleaning of the feeder is necessary to maintain a desirable level of performance. Such frequent cleaning is considered by many users to be difficult for several reasons. For example, the users must use a variety of brushes that can fit into the small mouth of the bottle to clean the interior. Cleaning using a rag or sponge is nearly impossible.

Accordingly, there is a clear need for novel hummingbird feeders that are easy to clean. Preferred embodiments of the invention are configured to provide a base that can easily be separated for cleaning.

SUMMARY

This and other unmet needs of the prior art are met by compounds and methods as described in more detail below.

Therefore, it is an object of the invention to provide a device of the type disclosed above which avoids the disadvantages inherent in conventional systems. In particular, the birdfeeder is to be constructed using a minimum number of components, the components are to be easily separable from one another, and the capable of being cleaned by readily available techniques (such as the dishwasher) and without the use of special cleaning chemicals.

A birdfeeder comprising: (a) a base portion; (b) a cover detachably coupled to the bottom portion, the cover comprising a threaded portion and at least one feeding port; (c) a reservoir comprising an open end and a closed end and defining a volume for storage of bird food, the open end of the reservoir additionally comprising a threaded portion adapted to complimentarily engage the threaded portion disposed in the cover, the reservoir in fluid communication with the base portion so as to supply bird food to the base portion such that the bird food is available to birds by the at least one feeding port; and (d) a cap detachably coupled to the reservoir.

In some embodiments, the base portion additionally comprises at least one perch support and at least one perch.

In certain embodiments, the base portion additionally comprises at least one engagement structure adapted to receive a tab disposed on an interior surface of the cover so as to detachably couple the base portion and the cover.

In certain embodiments, the reservoir additionally comprises a lip disposed proximal to the closed end and the cap additionally comprises at least one tab adapted to engage the lip so as to detachably couple the cap to the reservoir.

In certain embodiments, the reservoir additionally comprises at least one indentation disposed proximal to the closed end and the cap additionally comprises at least at least one ridge adapted to mate with the indentation so as to prevent rotation of the cap relative to the reservoir.

In certain embodiments, the base portion comprises a recessed area and at least one tab disposed in the recessed area and the cap comprises at least one channel and a complementary number of grooves extending at least substantially orthogonal thereto, the tabs of the recessed area being of sufficient size to traverse the channels and the grooves in the cap such that two similarly configured birdfeeders could be attached together.

BRIEF DESCRIPTION OF THE DRAWINGS

A better understanding of the exemplary embodiments of the invention will be had when reference is made to the accompanying drawings, wherein identical parts are identified with identical reference numerals, and wherein:

FIG. 1 provides one embodiment of a single hummingbird feeder of the present invention.

FIG. 2 is an exploded view of the hummingbird feeder shown in FIG. 1.

FIG. 3 illustrates an assembly of two of the hummingbird feeders shown in FIG. 1.

FIG. 4A provides a top perspective view of one embodiment of the cap component as used in the hummingbird feeder shown in FIG. 1.

FIG. 4B provides a bottom perspective view of one embodiment of the cap component as used in the hummingbird feeder shown in FIG. 1.

FIG. 4C provides a top view of one embodiment of the cap component as used in the hummingbird feeder shown in FIG. 1.

FIG. 4D provides a bottom view of one embodiment of the cap component as used in the hummingbird feeder shown in FIG. 1.

FIG. 4E provides a side view of one embodiment of the cap component as used in the hummingbird feeder shown in FIG. 1.

FIG. 4F provides a cross-sectional view of one embodiment of the cap component as used in the hummingbird feeder shown in FIG. 1.

FIG. 5A provides a top perspective view of one embodiment of the reservoir component as used in the hummingbird feeder shown in FIG. 1.

FIG. 5B provides a bottom perspective view of one embodiment of the reservoir component as used in the hummingbird feeder shown in FIG. 1.

FIG. 5C provides a top view of one embodiment of the reservoir component as used in the hummingbird feeder shown in FIG. 1.

FIG. 5D provides a bottom view of one embodiment of the reservoir component as used in the hummingbird feeder shown in FIG. 1.

FIG. 5E provides a side view of one embodiment of the reservoir component as used in the hummingbird feeder shown in FIG. 1.

FIG. 5F provides a cross-sectional view of one embodiment of the reservoir component as used in the hummingbird feeder shown in FIG. 1.

FIG. 8 provides a cross-sectional view of the hummingbird feeder shown in FIG. 1 and includes detailed views of the attachment of the base portion and cover components and of the attachment of the reservoir and cap components.

FIG. 9 provides a cross-sectional view of the assembly of hummingbird feeders shown in FIG. 3 and includes a detailed view of the attachment of the base portion of one hummingbird feeder to the cap of a second hummingbird feeder.

DETAILED DESCRIPTION

Figure 6A:
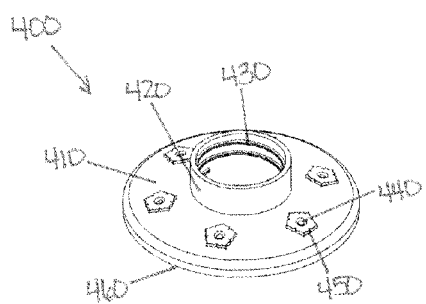
FIG. 6A provides a top perspective view of one embodiment of a cover component as used in the hummingbird feeder shown in FIG. 1.

The exemplary embodiments illustrated and described herein relate to birdfeeders. However, it should be understood that the inventive concepts described herein are applicable to a wide range of articles that are assembled to one another. Such articles may include, but are not limited to, birdfeeders, birdhouses, insect feeders, squirrel feeders, and other similar articles. While the description presented herein is directed to a birdfeeder, it should be understood that the inventive concepts are not limited solely to birdfeeder embodiments.

FIG. 1 illustrates a birdfeeder 100 formed from four components. FIG. 2 provides an exploded view of the four components of birdfeeder 100 shown in FIG. 1: a cap 200, a reservoir 300, a cover 400, and a base portion 500. FIG. 3 illustrates an assembly 600 of two of the hummingbird feeders 100 shown in FIG. 1, identified respectively as 100a and 100b.

FIG. 4A provides a top perspective view of cap 200. Cap 200 has disposed on its upper surface 210 an annular structure 220. The annular structure 220 has a plurality of vertical channels 240 disposed on its outer surface such that each channel 240 extends substantially from the top of the annular structure 220 to the intersection of the annular structure with upper surface 210. Each channel 240 intersects with a groove 250. Grooves 250 are oriented about the circumference of annular structure 220. The interior of annular structure 220 encircles hanging mount 230 which provides structure by which the birdfeeder may be suspended, using a string, a hook, or other suitable means from a tree branch, trellis, or the like.

Cap 200 may be formed from a variety of different materials including, but not limited to, metal or plastic (e.g., polypropylene, polyethylene, etc.) and may be formed by any of a variety of different processing techniques including, but not limited to, stamping or injection molding.

FIG. 4B provides a bottom perspective view of cap 200. Cap 200 has disposed on an interior surface 260 a plurality of tabs 270 and at least one substantially vertically oriented ridge 280.

FIG. 4C provides a top view of cap 200 revealing four channels 240 and four grooves 250. The cap may have disposed thereon any number of channels (and a corresponding number of grooves), including a single channel; however, it is preferred that the number of channels (and grooves) range from two to four.

FIG. 4D provides a bottom view of cap 200 revealing four tabs 270 and four ridges 280. The cap may have disposed thereon any number of tabs, including a single tab; however, it is preferred that the number of tabs range from two to four. The cap may also have disposed thereon any number of ridges, including zero; however, it is preferred that the number of ridges range from two to four.

FIG. 4E provides a side view of cap 200. FIG. 4F provides a cross-sectional view of cap 200 showing hanging mount 230.

FIG. 5A provides a top perspective view of reservoir 300. Reservoir 300 has a closed end 310 and an open end 320. Proximal to the closed end are a number of indentations 330 disposed on exterior surface 335 corresponding to the number of ridges 280 disposed on cap 200. The closed end 310 of reservoir 300 is sized so as to mate with the bottom of cap 200 such that exterior surface 335 is smaller than interior surface 260 to allow tab(s) 270 to engage lip 340 thereby securing cap 200 to reservoir 300. In embodiments where one or more ridge 280 is disposed on cap 200, the ridges are aligned with the indentations 330 to allow the cap to slide over the closed end of the reservoir. The ridges prevent the cap from rotating relative to the reservoir because the ridges occupy the space formed by the indentations. Tabs 270 provide an interference fit over lip 340 that prevents the cap from falling off the closed end of the reservoir. The open end of the reservoir 320 has a threaded portion 350 on its exterior.

Reservoir 300 may be formed from a variety of different materials including, but not limited to, metal or plastic (e.g., polypropylene, polyethylene, etc.) and may be formed by any of a variety of different processing techniques including, but not limited to, milling or blow-molding. Alternatively, reservoir 300 may be formed from two parts—a double open ended tubular portion and a cap portion that is affixed to the end of the tubular portion distal the threaded portion. In such embodiments, the cap portion may be welded, brazed, soldered, glued or heat welded to the tubular portion.

FIG. 5B provides a bottom perspective view of reservoir 300 detailing the open end 320 into which bird food may be deposited into the reservoir.

FIG. 5C provides a top view of reservoir 300 detailing closed end 310. FIG. 5D provides a bottom view of reservoir 300 detailing open end 320. FIG. 5E provides a side view of reservoir 300. FIG. 5F provides a cross-sectional view of reservoir 300.

FIG. 6A provides a top perspective view of cover 400. The upper surface 410 of cover 400 has disposed thereon an annular projection 420. The interior of annular projection 420 has a threaded portion 430 adapted to mate with threaded portion 350 of reservoir 300 to fixedly attach reservoir 300 to cover 400. The upper surface 410 of cover 400 also has disposed thereon one or more feeding ports 440 where a bird may obtain the bird food contained in the bird feeder. Each feeding port 440 may be decorated with a flower 450. The flower may be an integral part of cover 400 or may be separately constructed and then attached to the cover. The annular projection 420 may descend below the bottom lip 460 of cover 400.

Cover 400 may be formed from a variety of different materials including, but not limited to, metal or plastic (e.g., polypropylene, polyethlyene, etc.) and may be formed by any of a variety of different processing techniques including, but not limited to, stamping or injection molding.

Figure 6C:
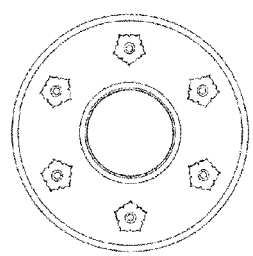
FIG. 6C provides a top view of one embodiment of a cover component as used in the hummingbird feeder shown in FIG. 1.
Figure 6E:
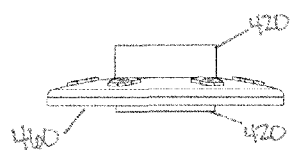
FIG. 6E provides a side view of one embodiment of a cover component as used in the hummingbird feeder shown in FIG. 1.
Figure 6F:
FIG. 6F provides a second side view of one embodiment of a cover component as used in the hummingbird feeder shown in FIG. 1.
Figure 6G:
FIG. 6G provides a cross-sectional view of one embodiment of a cover component as used in the hummingbird feeder shown in FIG. 1.
Figure 6B:
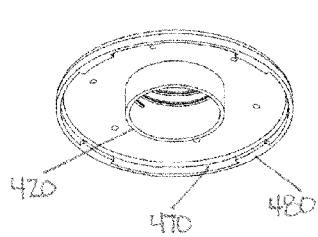
FIG. 6B provides a bottom perspective view of one embodiment of a cover component as used in the hummingbird feeder shown in FIG. 1.

FIG. 6B provides a bottom perspective view of cover 400. The interior surface 470 of cover 400 has disposed thereon one or more tabs 480; however, it is preferred that the number of tabs 480 range from two to four.

Figure 6D:
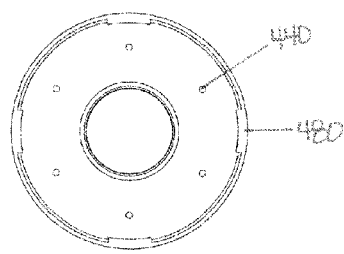
FIG. 6D provides a bottom view of one embodiment of a cover component as used in the hummingbird feeder shown in FIG. 1.

FIG. 6C provides a top view of one embodiment of cover 400 showing six feeding ports 440 surrounded by six integral decorative flowers 450. FIG. 6D provides a bottom view of cover 400 showing four tabs 480 and six feeding ports 440.

FIGS. 6E and 6F each provide a side view of cover 400. FIG. 6G provides a cross-sectional view of cover 400 revealing a threaded portion 430 disposed in the upper half of annular projection 420.

Figure 7A:
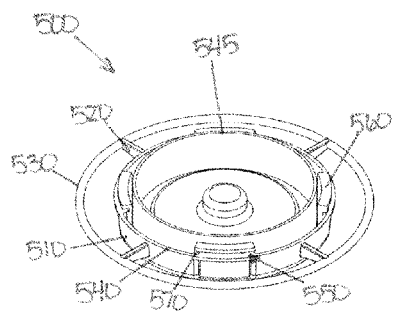
FIG. 7A provides a top perspective view of one embodiment of a base portion component as used in the hummingbird feeder shown in FIG. 1.

FIG. 7A provides a top perspective view of base portion 500. Disposed about outer surface 510 of base portion 500 are one or more perch supports 520 that hold perch 530 in a fixed position around outer surface 510. The outer surface 510 of base portion 500 terminates in upper lip 540. Upper lip 540 is sized and configured such that when cover 400 is attached to base portion 500, that bottom lip 460 rests atop upper lip 540. Cover 400 attaches to base 500 by the interaction of tabs 480 with grooves 550 located in engagement structure 560. The grooves 550 should be of equal number to tabs 480. To affix the cover to the base, the cover is aligned over the base portion such that upper lip 540 is covered by bottom lip 460 and the cover is rotated relative to the base portion such that tabs 480 enter grooves 550, establishing an interference fit, until tabs 480 are prevented from further movement by stopper 570. Because ridge 545 extends upwardly higher than upper lip 540 and because the open end of reservoir 300 descends below the top of ridge 545 when assembled, the bird food contained in reservoir 300 does not spill out of the birdfeeder.

Base portion 500 may be formed from a variety of different materials including, but not limited to, metal or plastic (e.g., polypropylene, polyethlyene, etc.) and may be formed by any of a variety of different processing techniques including, but not limited to, stamping or injection molding.

Figure 7C:
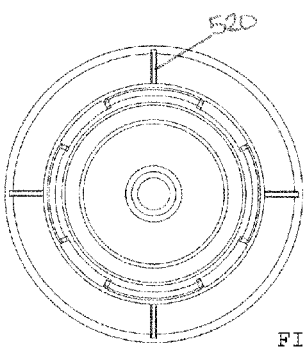
FIG. 7C provides a top view of one embodiment of a base portion component as used in the hummingbird feeder shown in FIG. 1.
Figure 7E:
FIG. 7E provides a side view of one embodiment of a base portion component as used in the hummingbird feeder shown in FIG. 1.
Figure 7F:
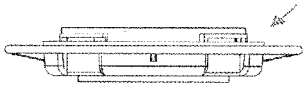
FIG. 7F provides a second view of one embodiment of a base portion component as used in the hummingbird feeder shown in FIG. 1.
Figure 7G:
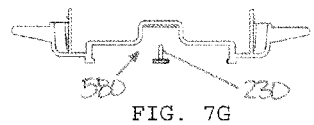
FIG. 7G provides a cross-sectional view of one embodiment of a base portion component as used in the hummingbird feeder shown in FIG. 1.
Figure 7B:
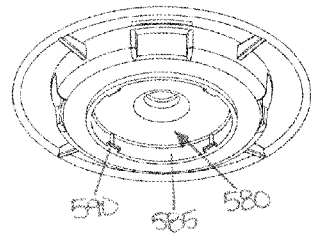
FIG. 7B provides a bottom perspective view of one embodiment of a base portion component as used in the hummingbird feeder shown in FIG. 1.

FIG. 7B provides a bottom perspective view of base portion 500 revealing recess area 580. Disposed on interior surface 585 within recess area 580 are one or more tabs 590. The number of tabs 590 should correspond with the number of channels 240 in cap 200. The tabs 590 should be sized such that the width of the tab fits within the width of the channel and that the height of the tabs fit within the height of the grooves. In this manner, a user may affix multiple birdfeeders together by stacking one atop the other such that tabs 590 descend channel 240 and then rotating one birdfeeder relative to the other such that tabs 590 engage grooves 250 thereby establishing an interference fit between the birdfeeders and securing them together.

FIG. 7C provides a top view of base portion 500 revealing four perch supports 520; however, any number of perch supports may be used, and in "perchless" embodiments perch supports may not be needed at all.

Figure 7D:
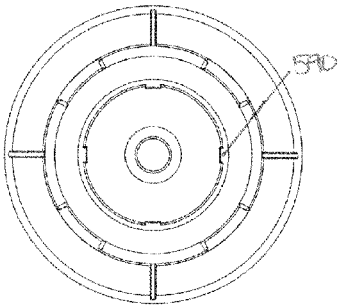
FIG. 7D provides a bottom view of one embodiment of a base portion component as used in the hummingbird feeder shown in FIG. 1.

FIG. 7D provides a bottom view of base portion 500 revealing four tabs 590. FIGS. 7E and 7F provide side views of base portion 500.

FIG. 7G provides a cross-sectional view of base portion 500 showing how recess area 580 compensates for the hanging mount 230 from a birdfeeder that is attached thereto.

FIG. 8 provides a cross-sectional view of hummingbird feeder 100 and the complimentary engagement of threaded portions 320 and 430. To refill the birdfeeder, the birdfeeder is disassembled by unscrewing the two threaded portions 320 and 430, refilling the reservoir and then re-screwing the two threaded portions together. FIG. 8 also provides a detailed view for the attachment of cap 200 to reservoir 300 by aligning the ridges 280 with the indentations 330 and snapping the cap 200 onto the closed end 310 of the reservoir 300 such that the tabs 270 engage lip 340. FIG. 8 additionally provides a detailed view of the attachment of cover 400 to base portion 500 by aligning tabs 480 with grooves 550 in engagement structure 560 and rotating until tabs 480 contact stoppers 570. Additionally, projection 555 assists in securing and retaining tabs 480 within grooves 550.

FIG. 9 provides a cross-sectional view of a stacked assembly of hummingbird feeders 600. FIG. 9 also provides a detailed view of the attachment of one birdfeeder 100a to a second birdfeeder 100b. Specifically, annular structure 220 of birdfeeder 100b is inserted into recess area 580 of birdfeeder 100a such that tabs 590 of birdfeeder 100a descend channels 240 in birdfeeder 100b. Birdfeeder 100a is then rotated relative to birdfeeder 100b such that tabs 590 of birdfeeder 100a engage grooves 250 of birdfeeder 100b to secure the birdfeeders together. Because these birdfeeders have complimentary configured parts, any number of birdfeeders can be "stacked" and attached together in this manner.

Because each of the components of the birdfeeder are attached to one another by an interference fit or by screw threads the birdfeeder is readily disassembled for cleaning and reassembled. Additionally, in embodiments made from plastic, the disassembled components can be hand-washed or even ran through the dishwasher.

The terms "a" and "an" and "the" and similar references used in the context of describing the disclosed embodiments (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the disclosed embodiments and does not pose a limitation on the scope of the disclosed embodiments unless otherwise claimed. No language in the specification should be construed as indicating any non-claimed element essential to the practice of the disclosed embodiments or any variants thereof.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability Preferred embodiments of this invention are described herein, including the best mode known to the inventors for carrying out the invention(s). Of course, variations on the disclosed embodiments will become apparent to those of ordinary skill in the art upon reading the foregoing description. The inventors expect skilled artisans to employ such variations as appropriate, and the inventors intend for the invention(s) to be practiced otherwise than specifically described herein. Accordingly, this disclosure includes all modifications and equivalents of the subject matter recited in the claims appended hereto as permitted by applicable law. Moreover, any combination of the above described elements in all possible variations thereof is encompassed by the disclosed embodiments unless otherwise indicated herein or otherwise clearly contradicted by context.

Having shown and described an embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A birdfeeder comprising:
    (a) a base portion comprising a recessed area and at least one tab disposed in said recessed area;
    (b) a cover detachably coupled to said base portion, said cover comprising a threaded portion and at least one feeding port;
    (c) a reservoir, said reservoir comprising an open end and a closed end and defining a volume for storage of bird food, said open end of said reservoir additionally comprising a threaded portion adapted to complimentarily engage said threaded portion disposed in said cover, said reservoir in fluid communication with said base portion so as to supply bird food to said base portion such that said bird food is available to birds by said at least one feeding port; and
    (d) a cap comprising at least one channel and a complementary number of grooves extending orthogonal thereto, said cap detachably coupled to said closed end of said reservoir, wherein said at least one tab of said recessed area are of sufficient size to traverse said at least one channel and said grooves in said cap.

2. The birdfeeder according to claim 1, wherein said base portion additionally comprises at least one perch support and at least one perch.

3. The birdfeeder according to claim 1, wherein said base portion additionally comprises at least one engagement structure adapted to receive a tab disposed on an interior surface of said cover so as to detachably couple said base portion and said cover.

4. The birdfeeder according to claim 1, wherein said reservoir additionally comprises a lip disposed proximal to said closed end and said cap additionally comprises at least one tab adapted to engage said lip so as to detachably couple said cap to said reservoir.

5. The birdfeeder according to claim 1, wherein said reservoir additionally comprises at least one indentation disposed proximal to said closed end and said cap additionally comprises at least at least one ridge adapted to mate with said indentation so as to prevent rotation of said cap relative to said reservoir.

* * * * *

UNITED STATES PATENT AND TRADEMARK OFFICE
CERTIFICATE OF CORRECTION

| | | |
|---|---|---|
| PATENT NO. | : 9,351,479 B2 | Page 1 of 1 |
| APPLICATION NO. | : 14/082423 | |
| DATED | : May 31, 2016 | |
| INVENTOR(S) | : David Chen and Leighton Chen | |

It is certified that error appears in the above-identified patent and that said Letters Patent is hereby corrected as shown below:

Column 8 Line 34 in Claim 5:
Please delete the duplicative "at least".

Signed and Sealed this
Second Day of August, 2016

Michelle K. Lee
*Director of the United States Patent and Trademark Office*